(12) United States Patent  (10) Patent No.: US 6,972,164 B2
Nemoto et al.  (45) Date of Patent: *Dec. 6, 2005

(54) LITHIUM SECONDARY BATTERY FOR USE IN ELECTRIC VEHICLE

(75) Inventors: Hiroshi Nemoto, Nagoya (JP); Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 426 days.

This patent is subject to a terminal disclaimer.

(21) Appl. No.: 10/235,123

(22) Filed: Sep. 5, 2002

(65) Prior Publication Data

US 2003/0008207 A1  Jan. 9, 2003

Related U.S. Application Data

(63) Continuation of application No. 09/389,767, filed on Sep. 2, 1999, now Pat. No. 6,479,186.

(30) Foreign Application Priority Data

Sep. 14, 1998 (JP) .................................. 10-259575

(51) Int. Cl.$^7$ ............................................. H01M 2/00
(52) U.S. Cl. .................. 429/231.95; 429/149; 429/178
(58) Field of Search .......................... 429/149, 231.95, 429/123, 224, 66, 72, 178, 240; 307/66, 72

(56) References Cited

U.S. PATENT DOCUMENTS

| 5,612,152 | A | 3/1997 | Bates |
| 6,071,638 | A | 6/2000 | Fradin |
| 6,132,902 | A * | 10/2000 | Miyasaka .................... 429/224 |
| 6,165,647 | A | 12/2000 | Watanabe et al. |
| 6,183,908 | B1 | 2/2001 | Miyasaka et al. |
| 6,476,186 | B1 * | 11/2002 | Hsieh et al. ................. 530/311 |

FOREIGN PATENT DOCUMENTS

| JP | 10-014013 | 1/1998 |
| JP | 10-92434 | 4/1998 |

OTHER PUBLICATIONS

Copending U.S. Appl. No. 09/186,308, filed Nov. 4, 2000, Kitoh.
Copending U.S. Appl. No. 10/205,082, filed Jul. 25, 2002, Kitoh.
Hideaki Horie et al., "Developement of a High-Power Lithium-Ion Battery System for HEVs," Society of Automotive Engineers of Japan, Inc. (JSAE), Spring Convention Proceedings, No. 971, pp. 53-56, 1997.

(Continued)

*Primary Examiner*—Michael Barr
*Assistant Examiner*—Monique Wills
(74) *Attorney, Agent, or Firm*—Burr & Brown

(57) ABSTRACT

A lithium secondary battery for use in electric vehicle, includes: a battery case, and an electricity-generating body including a positive electrode, a negative electrode, and a separator, the positive and the negative electrode being wound or laminated via the separator so that the positive electrode and negative electrode are not brought into direct contact with each other. Each single battery has a ratio (X/E) of battery output X (W) and battery energy E (Wh), of 2 to 36 or a product (R×E) of battery internal resistance R (mΩ) and battery energy E (Wh), of 50 to 900 (mΩ·Wh). The lithium secondary battery is used in an electric vehicle as combined batteries formed by connecting a required number of the single batteries in series. The lithium secondary battery is designed so as to have a particular ratio of battery output and battery energy or a particular product of battery internal resistance and battery energy and thereby is capable of exhibiting performances necessary for electric vehicle, such as acceleration and the like when used as combined batteries obtained by connecting a required number of single batteries in series.

10 Claims, 1 Drawing Sheet

OTHER PUBLICATIONS

Harris P et al: "The Development of High Power LI/SOCL$_2$ Batteries" Proceedings of the International Power Sources Symposium, US, New York, IEEE, vol. SYMP. 34, pp. 343-345 XP000222374 ISBN: 0-87942-604-7.

D. Fauteux, A. Massuco, C. Lampe-Önnerud, J. Shi: "Small particles electrodes for capacity application" The Electrochemical Society Proceedings, vol. 95-29, 1996, pp. 105-110 XP000865993.

W.L. Bowden, N. Iltchev, E. Wang, F. Goebel: "Electrical performance of spirally wound ion LiMn2O4 spinel cells" Thirteenth Annual Battery Conference on Applications and Advances, Jan. 13-16, 1998, pp. 223-224, XP000865826.

S.M. Oweis, J. Embrey, J. Willson, P. Alunans: "Rechargeable Lithium-Aluminum/Iron Sulfide Batteries for high energy density" 35th International Power Sources Symposium, Jun. 22-25, 1992, pp. 350-353, XP000865970.

Takei K et al: "The 200 V 2 kWh energy storage multicell system with 25 Wh Li/LiV3O8 single cells" Journal of Power Sources, CH, Elsevier Sequoia S.A. Lausanne, vol. 68, No. 1, p. 78-81 XP004100201 ISSN: 0378-7753.

Broussely M et al: "Lithium-ion batteries for electric vehicles: performances of 100 Ah cells", Journal of Power Sources, Elsevier Sequoia S.A. Lausanne, CH, vol. 68, No. 1, Sep. 1997, pp. 8-12, XP004100189, ISSN: 0378-7753.

Brouselly M Ed—Japan Electric Vehicle Association (JEVA): "Performance of a Lithium Ion Battery for Electric Vehicle", EVS-13. 13th. International Electric Vehicle Symposium. Osaka, Oct. 13-16, 1996. Sessions 1A-4H, EVS. International Electric Vehicle Symposium, Tokyo, JEVA, JP, vol. 1, SYMP. 13, Oct. 13, 1996, pp. 27-32, XP000687893.

Harris P et al: "The Developement of High Power LI/SOCL2 Batteries", Proceedings of the International Power Sources Symposium, US, New York, IEEE, vol. SYMP. 34, 1997, pp. 343-345, XP000222374, ISBN: 0-87942-604-7.

Marsh R A et al: "Bipolar lithium-ion battery development", Journal of Power Sources, Elsevier Sequoia S.A. Lausanne, CH, vol. 65, No. 1, Mar. 1997, pp. 133-141, XP 004059641, ISSN: 0378-7753.

Kohei Suzuki et al., "Development of the Nissan ALTRA-EV", JEVA Electric Vehicle Forum in heisei 9, Japan Electric Vehicle Association, Jan. 26, 1998, p46-55.

* cited by examiner

LITHIUM SECONDARY BATTERY FOR USE IN ELECTRIC VEHICLE

BACKGROUND OF THE INVENTION AND RELATED ART STATEMENT

The present invention relates to a lithium secondary battery for use in electric vehicle. More particularly, the present invention relates to a lithium secondary battery suitably used as a battery for driving the motor of an electric vehicle (including a hybrid electric vehicle).

In recent years, as the movement for environmental protection is increasingly becoming active, it has been investigated in the automobile industry to introduce, at a timing as early as possible, electric vehicles (EVs) or hybrid electric vehicles (HEVs) in place of conventional gasoline vehicles and the like using fossil fuels, and development of a battery used for driving of motor has become active because the battery is a key for practical use of electric car.

As the battery for EV or HEV, a lithium secondary battery has drawn attention in recent years for the high energy density. This battery can therefore give a long running distance covered per one charging operation, as compared with conventional lead-acid battery or metal-hydride battery.

The lithium secondary battery uses a lithium compound as the active material of positive electrode and a carbon material as the negative electrode. In the battery, the lithium ion in the positive electrode active material moves into the negative electrode active material during charging and, during discharging, the lithium ion captured by the negative electrode moves into the positive electrode; thereby, charging and discharging is conducted.

As one preferred structure of the lithium secondary battery, a structure having an electricity-generating body of wound-type is proposed. This wound-type battery is produced by placing, in a cylindrical battery case, an electricity-generating body 1 as shown in FIG. 2, obtained by winding a positive electrode 2 and a negative electrode 3 via a separator 4, and is suitable as a compact battery having electrodes of large area. Further in the wound-type battery, the numbers of lead wires 5 leading to electrodes 2 and 3 may be each at least one and, when the resistances for collecting electricity from electrodes 2 and 3 are desired to be made small, the number of lead wires can be increased; therefore, the inside structure of battery is not complex and the assembling of battery is easy.

The structure of the lithium secondary battery also includes a lamination type. The lamination type battery has an electricity-generating body obtained by alternately laminating a positive electrode and a negative electrode via a separator. Since this structure can be designed in any shape of a rectangular parallelepiped, a disc and a cylinder depending upon the shape of each electrode and the number of lamination, the lamination type battery is suitably used when there is a restriction as to the shape of the battery used. The lamination type battery, however, has a complicated internal structure for reasons such as the necessity of lead wire for each positive electrode and each negative electrode. Therefore, the wound-type battery is superior in view of the assembling operation.

The lithium secondary battery having such a structure has a terminal voltage of about 4 V and therefore is unable to use an aqueous electrolyte solution and must use a non-aqueous organic electrolyte solution having a lower lithium ion conductivity than the aqueous electrolyte solution does. This tends to allow the battery to have a large internal resistance. Since the acceleration of electric vehicle is determined mainly by the internal resistance and output of the battery used in the vehicle, it is important to make small the internal resistance of the battery and stabilize its output.

With respect to the properties of the lithium secondary battery for use in electric vehicle, the properties of a lithium secondary battery using $LiCoO_2$ as the positive electrode active material and hard carbon as the negative electrode active material are described in, for example, 1997 JSAE Spring Convention Proceedings No. 971 (JSAE stands for Society of Automotive Engineers of Japan, Inc.).

In designing a lithium secondary battery for use in electric vehicle, there is a generally known concept of making small the internal resistance of the battery and stabilizing its output in view of the acceleration of vehicle, as mentioned above. However, there is no clear idea yet on how the above concept is achieved using parameters, for example, the output, internal resistance, voltage drop and weight of battery.

In a battery for electric vehicle, it is clear that an output of a given level or higher is necessary in view of the acceleration of the vehicle. When the battery is allowed to have such a large volume that can produce an output necessary for giving a sufficient acceleration, however, the volume of the battery reduces the space utility of the vehicle; the total vehicle weight becomes large and the efficiency of the battery becomes low; and an increase in battery cost raises the vehicle cost by that much.

SUMMARY OF THE INVENTION

To alleviate the above problems, the present inventors made a study; as a result, the present inventors found out that in designing a lithium secondary battery for use in electric vehicle, a ratio of battery output and battery energy is very important and further that by allowing the ratio to fall in a given range, a lithium secondary battery having properties necessary for use in electric vehicle can be produced. The present invention has been completed based on the above finding.

According to the present invention, there is provided a lithium secondary battery for use in electric vehicle, comprising:
  a battery case, and
  an electricity-generating body including a positive electrode, a negative electrode, and a separator, the positive and the negative electrode being wound or laminated via the separator so that the positive electrode and negative electrode are not brought into direct contact with each other, wherein each single battery has a ratio (X/E) of battery output X (W) and battery energy E (Wh), of 2 to 36, and the lithium secondary battery is used in an electric vehicle as combined batteries formed by connecting a required number of the single batteries in series.

According to the present invention, there is also provided a lithium secondary battery for use in electric vehicle, comprising:
  a battery case, and
  an electricity-generating body including a positive electrode, a negative electrode, and a separator, the positive and the negative electrode being wound or laminated via the separator so that the positive electrode and negative electrode are not brought into direct contact with each other, wherein each single battery has a product (R×E) of battery internal resistance R (mΩ) and battery energy E (Wh), of 50 to 900 (mΩ·Wh), and the lithium secondary battery is used in an electric vehicle as combined batteries formed by connecting a required number of single batteries in series.

In the present invention, the combined batteries have an output of preferably 20 kW or more, more preferably 50 kW or more. Further, the combined batteries have a weight of preferably 100 kg or less, more preferably 50 kg or less.

Also in the present invention, the positive electrode active material is preferably lithium manganese oxide ($LiMn_2O_4$) having a spinel structure, more preferably Li-rich lithium manganese oxide having a spinel structure. The Li-rich lithium manganese oxide refers to a material composed of Li, Mn and O, wherein the proportion of Li is more (Li/Mn>0.5) than in the $LiMn_2O_4$ (stoichiometric composition, Li/Mn=0.5); and includes all the materials obtained by substituting the Mn of $LiMn_2O_4$ with Li and, depending upon the case, other element(s) (e.g. Cr, Ni, Co and/or Ti).

In the lithium secondary battery for use in electric vehicle according to the present invention, the electricity-generating body is preferably a wound-type.

DETAILED DESCRIPTION OF PREFERRED EMBODIMENT

Figure 1:
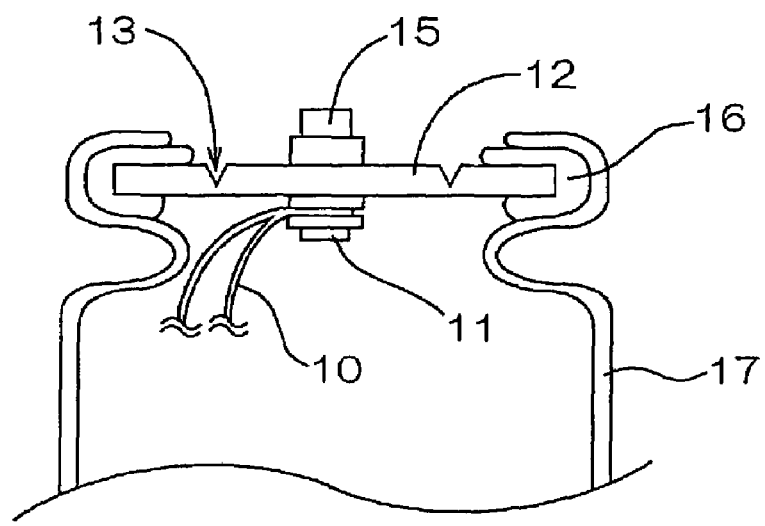
FIG. 1 is a sectional view showing the structure of the end of the lithium secondary battery produced in each Example.

Description is made first on the basic idea of the present invention.

The battery used in electric vehicle is required to have an output of given level or higher regardless of when the battery is used as an only source for accelerating an electric vehicle (EV) or when the battery is used for assisting the acceleration of a hybrid electric vehicle (HEV).

The battery undergoes the maximum load when the electric vehicle equipped with the battery enters a highway and is accelerated. In the case of an electric vehicle (EV) for four persons having a total weight of 1.2 ton, acceleration up to 100 km/h in 10 seconds is necessary; and the output required therefor is 50 kW×10 seconds, which is 140 Wh in energy. Therefore, the ratio of output and energy becomes 357.

Hence, when a vehicle is accelerated by a battery alone, the battery must have an output of 50 kW and an output/energy ratio of 357. When a battery is used for assisting the acceleration of a hybrid electric vehicle (HEV), the output/energy ratio is smaller naturally. When the output is, for example, 20 kW, the output/energy ratio becomes 143.

Since the above energy 140 Wh is an energy required for obtaining the maximum output one time, the energy must be larger when the battery is used in an actual EV, and hence the output/energy ratio becomes smaller. There is, for example, an actual case that acceleration is conducted up to 100 km/h in 10 seconds and immediately thereafter reacceleration is necessary; therefore, the energy must be larger for such reacceleration.

The output/energy ratio is small in view of the low practical applicability of battery of large output/energy ratio, i.e. small internal resistance. Conversely, when the ratio is large, the energy of battery may be small. That is, the weight and volume of battery can be made small, which is preferred.

Based on the above discussions, the present inventors thought that the battery for use in electric vehicle has a preferred range for the output energy ratio.

Description is made specifically below.

When the output of the combined batteries for use in electric vehicle is expressed as X (W), the X (W) is preferably 20 kW or more, more preferably 50 kW or more. An output of 50 kW is required when an electric vehicle for four persons, having a total weight of 1.2 tons is accelerated up to 100 km/h in 10 seconds, as mentioned previously. An output of at least about 20 kW is required when the combined batteries are used for assisting the motor of a HEV.

Next, the voltage of the combined batteries is expressed as V (V). When the combined batteries are used for EV for acceleration of its motor, the V is preferably 100 V or more, more preferably 200 V or more because the diameter of wire may be small when a high voltage and a small current are used. Meanwhile, the V is preferably 1,000 V or less, more preferably 500 V or less because a voltage similar to the upper limit of the dielectric strength of switching diode or a high voltage of certain level or higher is dangerous.

From the above, the current I of the combined batteries becomes I= X/V (A). Since all single batteries are connected in series, the current flowing through each single battery is the same I as well.

When the average discharge voltage of each single lithium secondary battery is set at 3.6 V, the number n of single batteries in combined batteries is n=V/3.6.

Here, the drop in voltage per single battery when the maximum power is generated, that is, a current of I (A) (which is 100 A or more) flows, must be 0.5 V or less, preferably 0.3 V or less. This is because, since the charge voltage for lithium secondary battery is 4.1 to 4.2 V and the average discharge voltage is 3.6 V, the difference is 0.5 to 0.6 V and, when an acceleration time of 10 seconds is considered, becomes about half thereof, i.e. 0.3 V or less.

Therefore, the internal resistance R of single battery becomes R= 0.5/X/V)×1000 (mΩ), preferably R=0.3/(X/V)×1000 (mΩ).

Here, the internal resistance of battery is investigated.

The internal resistance of single lithium secondary battery is basically determined by the electricity-generating area. That is, when the weight of the active material per unit area is the same, the internal resistance is determined by the capacity or energy. Incidentally, the internal resistance is affected by the thickness of current collector, the thickness of active material and the method of electricity collection. For example, when the thickness of active material is made very small, it is easily presumed that the internal resistance decreases; however, the energy density greatly decreases correspondingly thereto. Even if these maters are taken into consideration, however, the internal resistance of battery can be thought to be dependent upon the energy.

In existing lithium secondary batteries, the achievable internal resistance is 50 (mΩ·Wh) or more [≧50 (mΩ·Wh)]. Using this value, the energy per single battery for achieving the above internal resistance R can be calculated as follows.

The minimum energy per single battery is E=50/R (Wh), that is, E≧0.1X/V, preferably E≧0.17X/V. Therefore, the energy of combined batteries (energy per single battery×number of combined batteries) becomes $E_t$≧E×n= (0.1X/V)×(V/3.6)=0.028X, preferably $E_t$≧0.047X. Since the output of combined batteries is X, the output/energy ratio of battery for electric vehicle becomes X/$E_t$≦X/0.028X=36, preferably X/$E_t$≦21, and this becomes the upper limit of the output/energy ratio. This value is common to combined batteries and single battery.

Next, investigation is made on the lower limit of the output/energy ratio.

In the above, the upper limit of the output/energy ratio was determined. As a matter of course, the upper limit can be met by making large the energy, i.e. the battery size. In the battery for electric vehicle, however, a large battery size or a large battery weight leads to an increase in the total weight of electric vehicle or a decrease in the utility space of the electric vehicle. Further, an increase in battery cost, roughly corresponding to the increase in energy or size is invited. In view of these points, the weight of electric vehicle is preferably 100 kg or less, more preferably 50 kg or less.

The energy density of lithium secondary battery including the battery case is 100 Wh/kg. Therefore, the capacity (energy) of a 100-kg battery is 10 kWh. In a lithium secondary battery having an output of 20 kW, used in a hybrid electric vehicle for assisting its engine for acceleration, the output/energy ratio is 2 and this is the lower limit.

In an electric vehicle wherein the acceleration of the vehicle is made only by the battery used therein, the battery must have an output of 50 kW; therefore, the output/energy ratio ($X/E_r$) of the battery becomes $\leqq 5$. When the output is 50 kW and the battery weight is 50 kg, the output/energy ratio ($X/E_r$) is preferably $\geqq 10$.

In the above, attention was paid to the output/energy ratio of a lithium secondary battery, as a parameter to be considered when such a battery for an electric vehicle is designed; and an appropriate range of the ratio was investigated. When attention is paid to other parameter, that is, the internal resistance of lithium secondary battery dependent upon the energy (i.e. internal resistance x energy), the internal resistance x energy of a single battery becomes 900 (m$\Omega$·Wh) by making back calculation from the lower limit ($X/E_t \geqq 2$) of output/energy ratio. Therefore, the appropriate range of the parameter of internal resistance x energy becomes 50 to 900 (m$\Omega$·Wh).

In the above, the values of battery output and battery internal resistance are those when the depth of discharging (DOD) is 50%.

In the present invention, the weight of combined batteries is based only on the number of single batteries used, and does not consider the wiring, casing, etc. used when combined batteries are made, because there is a high freedom in designing an electric vehicle.

Next, in-depth description is made on the constituent features of the lithium secondary battery of the present invention.

Figure 2:
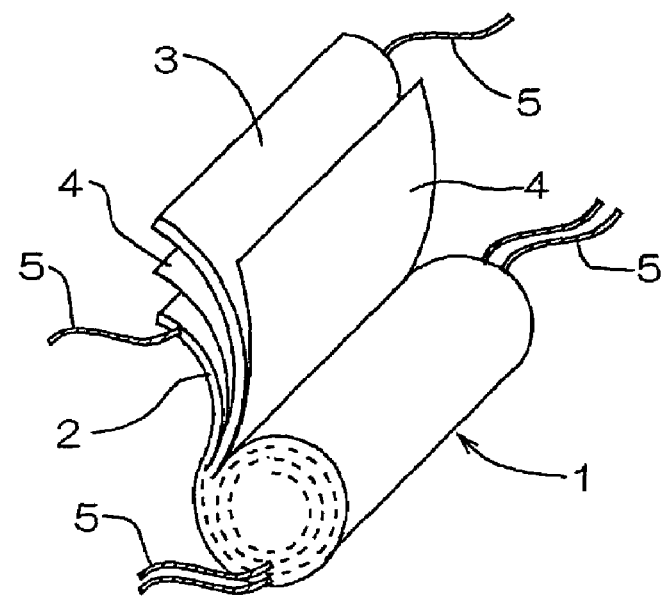
FIG. 2 is a perspective view showing the structure of an electricity-generating body of the wound-type.

In the lithium secondary battery of the present invention, the electricity-generating body is produced by winding or laminating a negative electrode and a positive electrode via a separator so that the two electrodes make no direct contact with each other. The specific structure of the electricity-generating body is preferably one shown in FIG. 2, that is, a wound-type electricity-generating body 1.

As the positive electrode, there is preferably used one obtained by mixing a positive electrode active material with a carbon powder (the carbon powder is for allowing the active material to have a higher conductivity) and coating the resulting mixture on an aluminum foil. In the present invention, there is preferably used, as the positive electrode active material, lithium manganese oxide ($LiMn_2O_4$) having a spinel structure. Most preferable is Li-rich lithium manganese oxide.

Even when $LiMn_2O_4$ is used, reduction in battery output is inevitable because, as the depth of discharging is larger, the coordination sites of lithium ion in positive electrode decrease and the diffusion of lithium ion into positive electrode gets slow. Nevertheless, $LiMn_2O_4$ is more advantageous than $LiCoO_2$ and $LiNiO_2$ because, with $LiMn_2O_4$, the diffusion of lithium ion is not restricted to the lithium plane of crystal structure unlike in the case of $LiCoO_2$ or $LiNiO_2$ and occurs three-dimensionally.

The positive electrode active material powder is preferably a powder whose particles have a narrow particle size distribution range and a shape as uniform as possible, so that the diffusion of lithium ions into the coordination sites in positive electrode active material during discharging becomes uniform. This applies when the positive electrode active material is not only $LiMn_2O_4$ but also $LiCoO_2$.

No matter what shape or particle diameters the electrode active material powder used has, when the powder is coated on a metal foil and fixed to produce an electrode, the area of the interface between electrode active material powder and electrolyte solution (the area acts as an electrode per unit weight) must not be small, or (even if the area between electrode active material powder and electrolyte solution is large) the increase in internal resistance of electrode caused by reduction in conductivity must not happen. That is, the electrode active material powder must be able to sufficiently exhibit the properties required for the electrode.

Secured path for the diffusion of lithium ion into positive electrode active material powder indicates good discharging property. It also indicates that the diffusion of lithium ion from positive electrode active material is good as well, that is, good charging property.

The carbon powder added to the positive electrode active material can be exemplified by acetylene black and graphite powder. As the aluminum foil constituting the positive electrode, an aluminum foil of high purity is preferred to prevent the reduction in battery performance caused by the corrosion due to the electrochemical reaction of the battery.

As the negative electrode, there can be used one obtained by coating, on a copper foil, a negative electrode active material such as amorphous carbon material (e.g. soft carbon or hard carbon) or carbon powder (e.g. natural graphite or artificial graphite). In the present invention, a highly graphitized carbon material such as graphite, artificial graphite or the like is particularly preferred as the negative electrode active material because the material enables easy lithium ion diffusion in crystal, has a large specific gravity, and can hold, per unit weight, a large amount of lithium ions contributing to charging and discharging.

As the copper foil constituting the negative electrode, a copper foil of high purity is preferred for the same reason as for the aluminum foil used in the positive electrode, that is, to prevent the reduction in battery performance caused by the corrosion due to the electrochemical reaction of the battery.

As the separator, there is preferably used a separator obtained by sandwiching a microporous polyethylene film capable of transmitting lithium ion with two same porous polypropylene films capable of transmitting lithium ion to form a three-layered structure. With this separator, when the temperature of the electricity-generating body gets high, the polyethylene film is softened at about 130° C. and the micropores collapse; as a result, the movement of lithium ions, i.e. the reaction of battery is suppressed; thus, the above separator acts also as a safety mechanism. By sandwiching the polyethylene film with two same polypropylene films of higher softening point, the separator can hold the shape even after the polyethylene film has softened, whereby the contact or short-circuiting between positive electrode and negative electrode can be prevented.

As the electrolyte solution, there is preferably used a non-aqueous organic electrolyte solution, for example, a solution obtained by dissolving $LiPF_6$ (electrolyte) in a mixed solution of ethylene carbonate (EC) and diethyl carbonate (DEC). As to the battery structure, there is no particular restriction, and a structure can be employed which is similar to a small-size lithium secondary battery but is larger than that.

As described above, the lithium secondary battery for use in electric vehicle according to the present invention has a particular ratio of battery output and battery energy or a particular product of battery internal resistance and battery energy and, as a result, when used as combined batteries, can allow an electric vehicle to have necessary properties such as acceleration and the like.

Next, description is made on Examples of the lithium secondary battery of the present invention. However, the present invention is in no way restricted to these Examples.

EXAMPLE 1

A positive electrode active material ($LiMn_2O_4$) and a carbon powder (acetylene black) (this powder was for allowing the active material to have a higher conductivity) were mixed, and the resulting mixture was coated on an aluminum foil to produce a positive electrode having an electrode surface shape of 3,400 mm in length of winding direction and 200 mm in width. Separately, a highly graphitized carbon material (a fibrous powder) was coated on a copper foil to produce a negative electrode of 3,600 mm in the winding direction and 200 mm in width. The positive electrode and the negative electrode were wound using, between them, a separator (an insulator) of 4,000 mm in length and 220 mm in width obtained by sandwiching a microporous polyethylene film capable of transmitting lithium ion with two same porous polypropylene films capable of transmitting lithium ion to form a three-layered structure, whereby an electricity-generating body was produced.

The electricity-generating body was placed in a cylindrical battery case, and one end of the case was sealed so as to become a sealed structure as shown in FIG. 1. Then, the case inside was filled with an electrolyte solution obtained by dissolving an electrolyte ($LiPF_6$) in a mixed solution of ethylene carbonate (EC) and diethyl carbonate (DEC). The other end of the case was also sealed so as to become the same sealed structure of FIG. 1, to produce a sealed battery.

In FIG. 1, a lead wire 10 for electricity collection is connected at one end to either of the positive electrode and the negative electrode (neither of them is shown) and at the other end to a metal-made rivet 11 fitted to an electrode disc 12 used for sealing of battery case 17. In the electrode disc 12 is formed a groove 13 acting a pressure-releasing valve which bursts at a given pressure. An external terminal 15 is electrically connected to the metal-made rivet 11 via the electrode disc 12. The battery case 17 is caulked via an ethylene-propylene rubber 16 so that the electrode disc 12 can be electrically insulated from the battery case 17. There is thus produced a cylindrical battery having a terminal at each end, wherein an external terminal 15 of a positive or negative electrode is provided at one end of the battery case 17. Incidentally, as the battery case 17 was used an aluminum-made cylinder of 50 mm in outer diameter, 1 mm in thickness and 240 mm in length; and as the electrode disc 12 were used an aluminum-made disc at the positive electrode side of the battery and a copper-made disc at the negative electrode side.

Electricity collection from each of the positive electrode and the negative electrode was conducted using lead wires welded to the electricity-collecting tabs formed at each of the positive electrode and the negative electrode. A plurality of electricity-collecting tabs are formed at each end of the electricity-generating body to achieve the above-mentioned battery structure. At each end of the electricity-generating body, the distance between two adjacent tabs were set so that when each electrode was spread in a plane, the distance was not longer than the circumference of battery and was about 100 mm; also at each end of the electricity-generating body, the plurality of electricity-collecting tabs were formed so that they were on one diameter of the end of the roll, i.e. the electricity-generating body.

The above-produced lithium secondary battery (single battery) had a weight of 860 g. The single battery had an energy of 95 Wh when charged up to 4.1 V at a constant current of 0.2C and constant voltage at 4.1 V and discharged down to 2.5 V at the same 0.2C. The single battery had an output of 600 W and an internal resistance of 4 mΩ. The values are those when the depth of discharging (DOD) was 50%.

Therefore, in the single battery, the output/energy ratio was 600/95= 6.3 and the internal resistance-energy product was 4×95=380.

85 such single batteries were connected in series to produce combined batteries, and the combined batteries were examined for properties.

The following results were obtained.
Av. discharge voltage of combined batteries: 305 V
Energy of combined batteries: 8.0 kWh
Output of combined batteries: 50 kW
Weight of combined batteries: 73 kg

EXAMPLE 2

A positive electrode active material [Li-rich lithium manganese oxide, $Li(Li_xMn_{2-x})O_4$ (x=0.05)] and a carbon powder (acetylene black) (this powder was for allowing the active material to have a higher conductivity) were mixed, and the resulting mixture was coated on an aluminum foil to produce a positive electrode having an electrode surface shape of 3,600 mm in length in the winding direction and 100 mm in width. Separately, highly graphitized carbon material (a fibrous powder) was coated on a copper foil to produce a negative electrode of 4,000 mm in length in the winding direction and 100 mm in width. The positive electrode and the negative electrode were wound using, between them, a separator (an insulator) of 4,500 mm in length and 120 mm in width obtained by sandwiching a microporous polyethylene film capable of transmitting lithium ions with two same porous polypropylene films capable of transmitting lithium ions to form a three-layered structure, whereby an electricity-generating body was produced.

The electricity-generating body was placed in a cylindrical battery case. Thereafter, the same operation as in Example 1 was conducted to produce a cylindrical battery having a terminal at each end. Incidentally, as the battery case 17 was used an aluminum-made cylinder of 50 mm in outer diameter, 1 mm in thickness and 140 mm in length; and as the electrode disc 12 were used an aluminum-made disc at the positive electrode side of the battery and a copper-made disc at the negative electrode side.

The above-produced lithium secondary battery (single battery) had a weight of 450 g. The single battery had an energy of 40 Wh when charged up to 4.1 V at a constant current of 0.2C and constant voltage at 4.1 V and discharged down to 2.5 V at the same 0.2C. The single battery had an output of 450 W and an internal resistance of 5 mΩ. The values are those when the depth of discharging (DOD) was 50%.

Therefore, in the single battery, the output/energy ratio was 450/40= 11.3 and the internal resistance-energy product was 5×40=200.

85 such single batteries were connected in series to produce combined batteries, and the combined batteries were examined for properties.

The following results were obtained.
- Av. discharge voltage of combined batteries: 305 V
- Energy of combined batteries: 3.4 kWh
- Output of combined batteries: 38 kW
- Weight of combined batteries: 39 kg

EXAMPLE 3

A positive electrode active material [Li-rich lithium manganese oxide, $Li(Li_xMn_{2-x})O_4$ (x=0.05)] and a carbon powder (acetylene black) (this powder was for allowing the active material to have a higher conductivity) were mixed, and the resulting mixture was coated on an aluminum foil to produce a positive electrode having an electrode surface shape of 5,600 mm in length in the winding direction and 50 mm in width. Separately, a highly graphitized carbon material (a fibrous powder) was coated on a copper foil to produce a negative electrode of 6,000 mm in length of winding direction and 50 mm in width. The positive electrode and the negative electrode were wound using, between them, a separator (an insulator) of 6,500 mm in length and 70 mm in width obtained by sandwiching a microporous polyethylene film capable of transmitting lithium ions with two same porous polypropylene films capable of transmitting lithium ions to form a three-layered structure, whereby an electricity-generating body was produced.

The electricity-generating body was placed in a cylindrical battery case. Thereafter, the same operation as in Example 1 was conducted to produce a cylindrical battery having a terminal at each end. Incidentally, as the battery case 17 was used an aluminum-made cylinder of 50 mm in outer diameter, 1 mm in thickness and 90 mm in length; and as the electrode disc 12 were used an aluminum-made disc at the positive electrode side of the battery and a copper-made disc at the negative electrode side.

The above-produced lithium secondary battery (single battery) had a weight of 270 g. The single battery had an energy of 22 Wh when charged up to 4.1 V at a constant current of 0.2C and constant voltage at 4.1 V and discharged down to 2.5 V at the same 0.2C. The single battery had an output of 450 W and an internal resistance of 5 mΩ. The values are those when the depth of discharging (DOD) was 50%.

Therefore, in the single battery, the output/energy ratio was 450/22= 20.5 and the internal resistance-energy product was 5×22=110.

120 such single batteries were connected in series to produce combined batteries, and the combined batteries were examined for properties.

The following results were obtained.
- Av. discharge voltage of combined batteries: 430 V
- Energy of combined batteries: 2.6 kWh
- Output of combined batteries: 54 kW
- Weight of combined batteries: 33 kg

COMPARATIVE EXAMPLE

A positive electrode active material ($LiCoO_2$) and a carbon powder (acetylene black) (this powder was for allowing the active material to have a higher conductivity) were mixed, and the resulting mixture was coated on an aluminum foil to produce a positive electrode having an electrode surface shape of 3,200 mm in length of winding direction and 200 mm in width. Separately, a highly graphitized carbon material (a fibrous powder) was coated on a copper foil to produce a negative electrode of 3,500 mm in length in the winding direction and 200 mm in width. The positive electrode and the negative electrode were wound using, between them, a separator (an insulator) of 4,000 mm in length and 220 mm in width obtained by sandwiching microporous polyethylene film capable of transmitting lithium ions with two same porous polypropylene films capable of transmitting lithium ions to form a three-layered structure, whereby an electricity-generating body was produced.

The electricity-generating body was placed in a cylindrical battery case. Thereafter, the same operation as in Example 1 was conducted to produce a cylindrical battery having a terminal at each end. Incidentally, as the battery case 17 was used an aluminum-made cylinder of 50 mm in outer diameter, 1 mm in thickness and 240 mm in length; and as the electrode disc 12 were used an aluminum-made disc at the positive electrode side of the battery and a copper-made disc at the negative electrode side.

The above-produced lithium secondary battery (single battery) had a weight of 850 g. The single battery had an energy of 110 Wh when charged up to 4.1 V at a constant current of 0.2C and constant voltage at 4.1 V and discharged down to 2.5 V at the same 0.2C. The single battery had an output of 160 W and an internal resistance of 15 mΩ. The values are those when the depth of discharging (DOD) was 50%.

Therefore, in the single battery, the output/energy ratio was 160/140= 1.45 and the internal resistance-energy product was 15×110=1,650.

120 such single batteries were connected in series to produce combined batteries, and the combined batteries were examined for properties.

The following results were obtained.
- Av. discharge voltage of combined batteries: 430 V
- Energy of combined batteries: 13.2 kWh
- Output of combined batteries: 19 kW
- Weight of combined batteries: 102 kg (Measurements of Internal Resistance and Output of Battery)

Each of the batteries produced in Examples 1 to 3 and Comparative Example was measured for internal resistance by closing the circuit, conducting discharging at a constant current of 0.2 C rate and dividing the difference between the voltage at circuit opening and the voltage immediately after the start of discharging, by the current. Each battery was also measured for output by conducting constant-current discharging for 10 seconds at such a current that the discharge voltage did not become lower than 2.5 V in 10 seconds from the start of discharging and measuring a voltage-current product at the $10^{th}$ seconds.

As is clear from the above results, in the battery of Comparative Example having an output/energy ratio of smaller than 2 (an internal resistance-energy product of larger than 900), the combined batteries produced therefrom show a low output of 10 kW, which is unable to give sufficient acceleration to an electric vehicle. Also, the combined batteries have a large weight of 102 kg, which becomes one reason for an increase in total weight of electric vehicle.

In the batteries of Examples 1 to 3 each having an output/energy ratio of 2 to 36 (an internal resistance-energy product of 50 to 900), the combined batteries produced therefrom have an output of 38 to 54 kW, which is able to give sufficient acceleration to a hybrid electric vehicle or an electric vehicle. Also, the combined batteries have a weight of 33 to 73 kg, which is lighter than in Comparative Example.

Examples 1 to 3 are compared with each other. In Example 1, the single battery is large in size and the combined batteries are slightly heavy; however, the combined batteries have an output of 50 kW and are usable in an electric vehicle. In Example 2, the single battery is smaller in size than in Example 1 and is advantageous from the standpoint of the increase in total weight of vehicle; however, the combined batteries have an output of 38 kW and is usable in HEV for assisting the engine but not usable in EV. In Example 3, the single battery is even smaller in size than in Examples 1 and 2 and the combined batteries have a high output of 54 kW and are usable in EV; however, the combined batteries have an energy of 2.6 kWh (this is smaller than in Examples 1 and 2) and are not appropriate for repeated acceleration.

What is claimed is:

1. A lithium secondary battery for use in an electric vehicle, said battery comprising:
   a battery case, and
   an electricity-generating body including a positive electrode having a plurality of current collecting portions, a negative electrode having a plurality of current collecting portions, a separator and a non-aqueous organic electrolyte, the positive and the negative electrode being wound or laminated via the separator so that the positive electrode and negative electrode are not brought into direct contact with each other,
   said lithium secondary battery having a ratio (X/E) of battery output X (W) and battery energy E (Wh), of 2 to 36.

2. A lithium secondary battery for use in an electric vehicle, said battery comprising:
   a battery case, and
   an electricity-generating body including a positive electrode having a plurality of current collecting portions, a negative electrode having a plurality of current collecting portions, a separator and a non-aqueous organic electrolyte, the positive and the negative electrode being wound or laminated via the separator so that the positive electrode and negative electrode are not brought into direct contact with each other,
   said lithium secondary battery having a product (R×E) of battery internal resistance R (mΩ) and battery energy E (Wh), of 50 to 900 (mΩ·Wh).

3. A lithium secondary battery according to claim 1, wherein the positive electrode comprises, as the active material, lithium manganese oxide ($LiMn_2O_4$) having a spinel structure.

4. A lithium secondary battery according to claim 2, wherein the positive electrode comprises, as the active material, lithium manganese oxide ($LiMn_2O_4$) having a spinel structure.

5. A lithium secondary battery according to claim 1, wherein the positive electrode comprises, as the active material, Li-rich lithium manganese oxide having a spinel structure.

6. A lithium secondary battery according to claim 2, wherein the positive electrode comprises, as the active material, Li-rich lithium manganese oxide having a spinel structure.

7. A lithium secondary battery according to claim 1, wherein the negative electrode comprises amorphous carbon material or carbon powder.

8. A lithium secondary battery according to claim 2, wherein the negative electrode comprises amorphous carbon material or carbon powder.

9. An electric vehicle comprising a lithium secondary battery series, said battery series comprising:
   a plurality of lithium secondary batteries connected in series, each lithium secondary battery comprising:
     a battery case, and
     an electricity-generating body including a positive electrode having a plurality of current collecting portions, a negative electrode having a plurality of current collecting portions, a separator and a non-aqueous organic electrolyte, the positive and the negative electrode being wound or laminated via the separator so that the positive electrode and negative electrode are not brought into direct contact with each other,
   each said lithium secondary battery having a ratio (X/E) of battery output X (W) and battery energy E (Wh), of 2 to 36.

10. An electric vehicle comprising a lithium secondary battery series, said battery series comprising:
    a plurality of lithium secondary batteries connected in series, each lithium secondary battery comprising:
      a battery case, and
      an electricity-generating body including a positive electrode having a plurality of current collecting portions, a negative electrode having a plurality of current collecting portions, a separator and a non-aqueous organic electrolyte, the positive and the negative electrode being wound or laminated via the separator so that the positive electrode and negative electrode are not brought into direct contact with each other,
    said lithium secondary battery having a product (R×E) of battery internal resistance R (mΩ) and battery energy E (Wh), of 50 to 900 (mΩ·Wh).

* * * * *

UNITED STATES PATENT AND TRADEMARK OFFICE
CERTIFICATE OF CORRECTION

PATENT NO.    : 6,972,164 B2
DATED         : December 6, 2005
INVENTOR(S)   : Hiroshi Nemoto et al.

It is certified that error appears in the above-identified patent and that said Letters Patent is hereby corrected as shown below:

Column 1,
Line 6, after Title add -- This application is a continuation of 09/389,767, filed September 2, 1999 now U.S. Patent 6,479,186. --.

Column 2,
Lines 5, 12 and 19, change "vehicle" to -- vehicles --.
Line 14, add -- the -- after second occurrence of "of".
Line 17, add -- the -- after "of".
Line 23, delete "a" after "giving".

Column 3,
Lines 18 and 34, change "vehicle" to -- vehicles --.
Lines 35 and 61, add -- a -- after first occurrence of "of".
Lines 63 and 64, add -- the -- after "of".
Line 66, add -- an -- after "in".

Column 4,
Line 3, change "vehicle" to -- vehicles --.
Line 34, add -- a -- after "of".
Lines 37, 43, 45 and 49, add -- the -- after "of".
Line 38, add -- a -- after "of".
Line 44, add -- the -- after the first occurrence of "of".
Line 48, change "maters" to -- matters --.
Line 61, add -- a -- after "of" and add -- an -- after "for".
Line 64, change "battery" to -- batteries --.

Column 5,
Line 4, add -- an -- after "for".
Line 6, add -- the -- after "of".
Line 9, add -- the -- after the second occurrence of "of".
Lines 11 and 28, add -- a -- after "of".
Line 27, change "parameter" to -- parameters --.
Line 32, add -- the -- before "output/energy".

Column 6,
Line 8, add -- the -- before "positive".
Line 17, add -- the -- before "electrode" and before "electrolyte".
Line 18, add -- the -- after "of".
Line 22, change "path" to -- paths --.
Line 48, delete first and second occurrences of "the".

UNITED STATES PATENT AND TRADEMARK OFFICE
CERTIFICATE OF CORRECTION

PATENT NO. : 6,972,164 B2
DATED : December 6, 2005
INVENTOR(S) : Hiroshi Nemoto et al.

It is certified that error appears in the above-identified patent and that said Letters Patent is hereby corrected as shown below:

Column 6 (cont'd),
Lines 52 and 53, change "ion" to -- ions --.
Line 58, add -- the -- after "of" and -- , -- after "battery".
Line 63, add -- the -- after "between".

Column 7,
Line 24, change "of" to -- in the --.
Line 28, add -- length in -- before first occurrence of "the".
Lines 33 and 34, change "ion" to -- ions --.
Line 49, add -- the -- after "of".

Column 9,
Line 28, change second occurrence of "of" to -- in the --.

Column 10,
Line 8, change second occurrence of "of" to -- in the --.
Line 55, delete "rate".

Column 11,
Line 20, change "is" to -- are --.

Signed and Sealed this

Eleventh Day of April, 2006

JON W. DUDAS
*Director of the United States Patent and Trademark Office*